US011794833B2

(12) United States Patent
Mo

(10) Patent No.: US 11,794,833 B2
(45) Date of Patent: Oct. 24, 2023

(54) VEHICLE HEADLINER ASSEMBLY SYSTEM AND VEHICLE HEADLINER ASSEMBLY METHOD

(71) Applicants:Hyundai Motor Company, Seoul (KR); Kia Corporation, Seoul (KR)

(72) Inventor: Young Kyun Mo, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/873,034

(22) Filed: Jul. 25, 2022

(65) Prior Publication Data
US 2023/0150596 A1 May 18, 2023

(30) Foreign Application Priority Data
Nov. 18, 2021 (KR) .......................... 10-2021-0159438

(51) Int. Cl.
| | |
|---|---|
| *B62D 65/02* | (2006.01) |
| *B25J 15/00* | (2006.01) |
| *B60R 13/02* | (2006.01) |
| *B62D 65/14* | (2006.01) |
| *B25J 11/00* | (2006.01) |

(52) U.S. Cl.
CPC ........ *B62D 65/026* (2013.01); *B25J 15/0052* (2013.01); *B60R 13/0212* (2013.01); *B62D 65/022* (2013.01); *B25J 11/005* (2013.01); *B62D 65/14* (2013.01)

(58) Field of Classification Search
CPC .... B60R 13/0212–0231; B62D 65/022; B62D 65/026; B62D 65/028; B62D 65/14; B62D 65/18; B23P 19/04; B23P 2700/50; B25J 11/005; B25J 15/0052; B25J 15/009
See application file for complete search history.

(56) References Cited

U.S. PATENT DOCUMENTS

| | | | |
|---|---|---|---|
| 4,553,309 A | 11/1985 | Hess et al. | |
| 4,728,383 A | 3/1988 | Kaller et al. | |
| 5,688,022 A | 11/1997 | Adams et al. | |
| 5,795,015 A * | 8/1998 | Corpe | ................. B60R 13/0212 296/214 |
| 6,273,499 B1 * | 8/2001 | Guyon | ................. B60R 13/0212 174/72 A |

FOREIGN PATENT DOCUMENTS

| | | |
|---|---|---|
| JP | 2572587 B2 | 1/1997 |
| JP | 2002-120660 A | 4/2002 |

(Continued)

*Primary Examiner* — Matthew P Travers
(74) *Attorney, Agent, or Firm* — Fox Rothschild LLP

(57) ABSTRACT

A vehicle headliner assembly system is provided. The system includes an articulated mounting robot having multiple degrees of freedom, an assembly jig fastened to the mounting robot, a vehicle headliner coupled to the assembly jig, a gripper provided in the assembly jig and configured to engage the headliner, a pressurization unit provided and configured to pressurize the headliner to couple the headliner to a vehicle body; and a control unit. The control unit is configured to control the mounting robot to move the assembly jig, to control the gripper to attach or detach the assembly jig to or from the headliner, and to control the pressurization unit to couple the headliner to the vehicle body.

15 Claims, 8 Drawing Sheets

(56) References Cited

FOREIGN PATENT DOCUMENTS

| KR | 20-0132823 Y1 | 9/1998 | |
|----|---|---|---|
| KR | 10-0772162 B1 | 10/2007 | |
| KR | 101617240 B1 * | 5/2016 | ............. B62D 65/14 |
| KR | 10-2017-0030392 A | 3/2017 | |
| KR | 10-2017-0048628 A | 5/2017 | |
| KR | 101859877 B1 * | 5/2018 | ............. B23P 19/04 |

* cited by examiner

VEHICLE HEADLINER ASSEMBLY SYSTEM AND VEHICLE HEADLINER ASSEMBLY METHOD

CROSS-REFERENCE TO RELATED APPLICATION(S)

This application is based on and claims under 35 U.S.C. 119 the benefit of Korean Patent Application No. 10-2021-0159438, filed on Nov. 18, 2021, in the Korean Intellectual Property Office, the disclosure of which is herein incorporated by reference in its entirety.

TECHNICAL FIELD

Embodiments of the present disclosure relate to a vehicle headliner assembly system and a vehicle headliner assembly method wherein position correction based on image capture and full process automation resolve nonuniformity of assembly quality which may occur if operators manually mount and assembly vehicle headliners individually with regard to various vehicle types, and manpower required for processes is reduced, thereby improving productivity.

DESCRIPTION OF RELATED ART

Clips, bolts, nuts, and other kinds of hardware refer to mechanical elements widely used to couple two or more components. In generally, a vehicle headliner is mounted in the following manner: an operator manually aligns a clip provided on the headliner with a coupling portion of the vehicle body and pressurizes the clip part.

That is, conventional headliner mounting processes have a quality problem in that headliners are contaminated, bent, and the like during manual handling by operators. In addition, headliners have large volumes and require two or more operators during manual handling, thereby placing restrictions on reducing manpower necessary for processes and improving productivity.

This may be solved by automating the entire headliner mounting process by using robots and the like. However, such automated processes cannot easily align clips provided on headliners with coupling portions of vehicle bodies in correct positions, and it is thus necessary to secure an assembly process automation system having a control system capable of position correction based on image capture or the like.

The above descriptions regarding background technologies have been made only to help understanding of the background of the present disclosure and are not to be deemed by those skilled in the art to correspond to already-known existing technologies.

SUMMARY

Embodiments of the present disclosure have been proposed to solve the above-mentioned problems, and it is an exemplary embodiment of the present disclosure to provide a vehicle headliner assembly system and a vehicle headliner assembly method wherein position correction based on image capture and full process automation resolve nonuniformity of assembly quality which may occur if operators manually mount and assembly vehicle headliners individually with regard to various vehicle types, and manpower required for processes is reduced, thereby improving productivity.

In one embodiment, a vehicle headliner assembly system comprising: (a) an articulated mounting robot having multiple degrees of freedom; (b) an assembly jig fastened to the mounting robot; (c) a vehicle headliner coupled to the assembly jig; (d) a gripper provided in the assembly jig and configured to engage or grip the headliner; (e) a pressurization unit provided and configured to pressurize the headliner to couple the headliner to a vehicle body; and (f) a control unit configured to control the mounting robot to move the assembly jig, control the gripper to attach or detach the assembly jig to or from the headliner, and control the pressurization unit to couple the headliner to the vehicle body.

In a further embodiment, a vehicle headliner assembly system includes an articulated mounting robot having multiple degrees of freedom, an assembly jig fastened to an end of the mounting robot, a vehicle headliner coupled to the assembly jig, a gripper provided in the assembly jig and configured to grip an assist handle of the headliner, a pressurization unit provided in the assembly jig and configured to pressurize the headliner to fasten a clip configured to couple the headliner to a vehicle body, and a control unit configured to control the mounting robot to move the assembly jig to which the headliner has been mounted, control the gripper to attach or detach the assembly jig to or from the headliner, and control the pressurization unit to couple the headliner to the vehicle body.

The vehicle headliner assembly system according to embodiments of the present disclosure may further include a movement prevention unit provided in the assembly jig and inserted into a sun visor hole formed on the headliner so that the headliner is fixed to a normal position so as not to move on the assembly jig.

The gripper may include a handle opening unit configured to open the assist handle having been folded onto the headliner, an opening identification sensor configured to identify whether the assist handle is normally opened, a handle clamping unit configured to clamp the opened assist handle, and a clamping identification sensor configured to identify whether the assist handle is normally opened.

The handle opening unit may include an opening cylinder configured to unidirectionally slide in one direction between right and left directions of the vehicle body, and a handle opening attach configured to open the assist handle of the headliner according to sliding of the opening cylinder.

Multiple handle opening attaches may be provided and formed on the left and the right of the assembly jig to be symmetrical to each other, and the handle opening unit may further include an equalizer configured to covert a linear movement according to unidirectional sliding of the opening cylinder into a rotary movement and a rotary movement into a linear movement in a direction opposite to the sliding direction of the opening cylinder, and a first shaft slid in left and right directions by the equalizer to slide together with the multiple handle opening attaches formed on the left and the right of the assembly jig to be symmetrical to each other.

The opening identification sensor may be installed on a lateral surface of the first shaft at a predetermined distance apart and may detect positions of a top dead point and a bottom dead point when the first shaft slides in left and right directions so as to determine whether the assist handle of the headliner is normally opened.

The handle clamping unit may include an angle limitation unit configured to limit the assist handle of the headliner not to be opened beyond a predetermined angle, and a clamping cylinder configured to clamp or release clamping of the assist handle of the headliner by moving the handle opening attach provided in the handle opening unit upward or downward.

The clamping identification sensor may be installed on one side of the handle opening attach at a predetermined distance apart and may detect a top dead point and a bottom dead point when the handle opening attach slides in upward and downward directions so as to determine whether the assist handle of the headliner is normally clamped.

The pressurization unit may include a clip pressurization attach configured to pressurize a clip to mount the headliner to the vehicle body, a pressurization cylinder configured to fasten a clip of the headliner to the vehicle body by moving the clip pressurization attach up or down, and a pressurization identification sensor configured to identify whether a clip is normally pressurized.

The pressurization identification sensor may be installed on one side of the clip pressurization attach at a predetermined distance apart and may detect positions of a top dead point and a bottom dead point of a piston rod of the pressurization cylinder when the clip pressurization attach slides in upward and downward directions so as to determine whether the clip of the headliner is normally pressurized.

The assembly jig of the vehicle headliner assembly system according to embodiments of the present disclosure may further include a second shaft coupled and fixed to the assembly jig at one side thereof, formed to rotate within a predetermined angle with reference to the fixed side, and having a roller formed at the end of the other side thereof and bonded to a lower side of the headliner, and a mounting identification sensor installed on a lateral surface of the fixed side of the second shaft and configured to detect an angle change of the second shaft.

Multiple pressurization units and grippers may be provided, the pressurization units may be formed to be bilaterally symmetrical at the front, middle, and rear sides of the assembly jig along the edge of the assembly jig, and the grippers may be positioned between the pressurization units excluding the pressurization units formed at the front side of the assembly jig so that two pressurization units are arranged to form a pair by being spaced a predetermined distance apart from each other on both sides of each of the grippers.

The vehicle headliner assembly system may further include a photographing unit configured to capture each position of a fastening part of the vehicle body to which the clip of the headliner is fastened, and the assist handle of the headliner gripped by the gripper, and the control unit may calculate a correction value on the basis of captured information and move the mounting robot on the basis of the correction value.

A vehicle headliner assembly method using a vehicle headliner assembly system according to embodiments of the present disclosure may include controlling, by a control unit, a gripper provided on an assembly jig to grip an assist handle of a headliner, controlling, by the control unit, an articulated mounting robot having multiple degrees of freedom to move the assembly jig having the headliner mounted thereto, and fastening a clip configured to couple the headliner to a vehicle body by controlling a pressurization unit provided on the assembly jig by the control unit.

The fastening a clip of the vehicle headliner assembly method using a vehicle headliner assembly system according to embodiments of the present disclosure may include fastening a clip positioned at the front of the headliner, fastening a clip positioned at the middle side of the headliner, and fastening a clip positioned at the rear of the headliner.

A vehicle headliner assembly system and a vehicle headliner assembly method according to embodiments of the present disclosure are advantageous in that position correction based on image capture and full process automation resolve nonuniformity of assembly quality which may occur if operators manually mount and assembly vehicle headliners individually with regard to various vehicle types, and manpower required for processes is reduced, thereby improving productivity.

As discussed, the method and system suitably include use of a controller or processer.

In another embodiment, vehicles are provided that comprise an apparatus as disclosed herein.

BRIEF DESCRIPTION OF THE DRAWINGS

The above and other embodiments, features and advantages of the present disclosure will be more apparent from the following detailed description taken in conjunction with the accompanying drawings, in which.

DETAILED DESCRIPTION OF THE EXEMPLARY EMBODIMENTS

Figure 1:
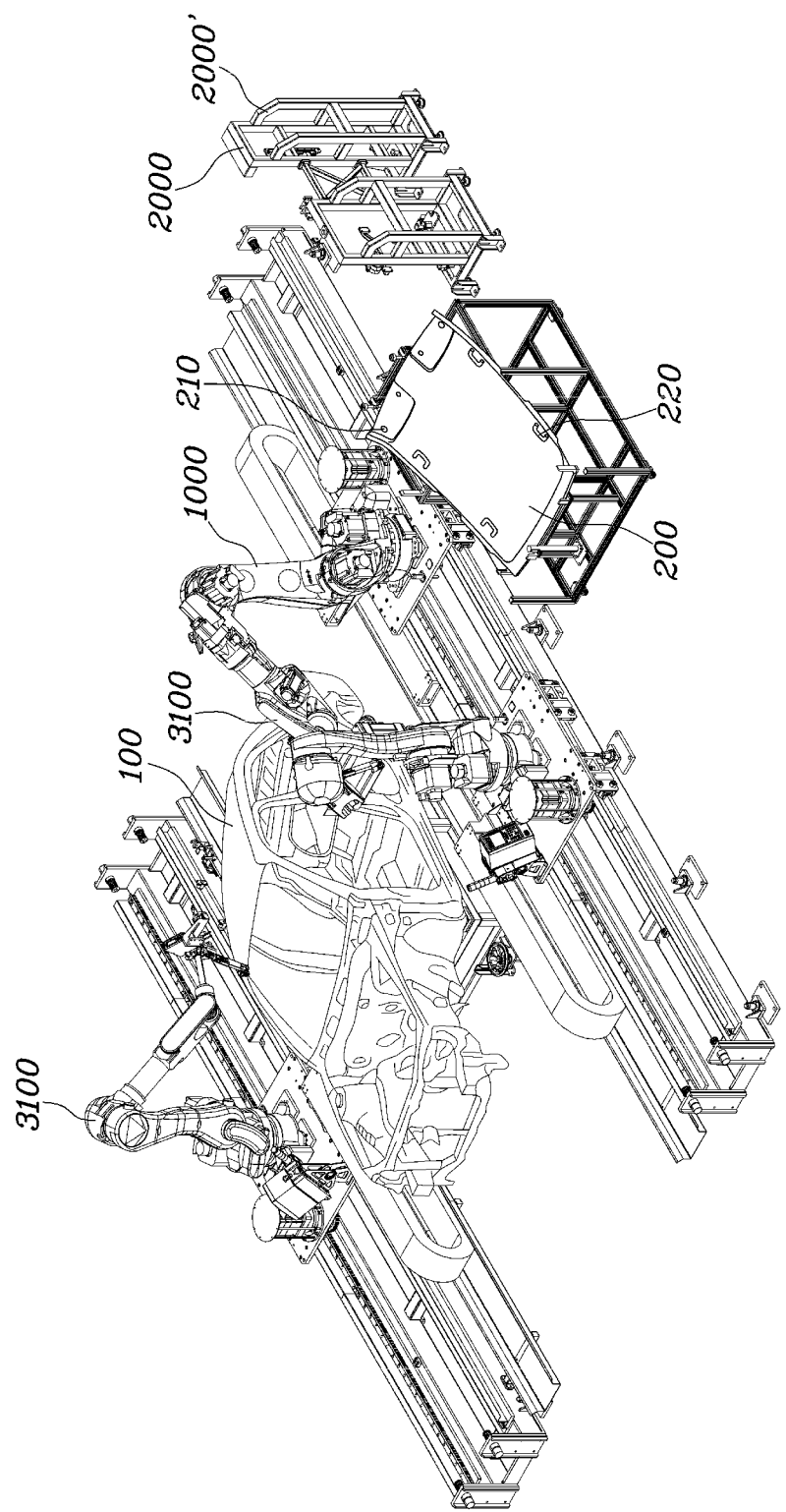
FIG. 1 is a drawing illustrating a vehicle headliner assembly system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Throughout embodiments of the present disclosure, when it is described that a part "includes or comprises" a certain element, it should be understood that the part may include (or comprise) other elements as well, rather than excluding other elements, unless specifically described otherwise.

Furthermore, in describing various components, terms such as "first" and/or "second" may be used. However, the terms are used to only distinguish one element from the other element, and without departing from the scope of rights according to the concept of the present disclosure, the first element may be referred to as the second element, and the second element may also be referred to as the first element.

Hereinafter, the configuration and operating principle of various embodiments of the present disclosure will be described in detail with reference to the accompanying drawings.

FIG. 1 is a drawing illustrating a vehicle headliner assembly system of according to an exemplary embodiment of the present disclosure.

Referring to FIG. 1, the vehicle headliner assembly system according to embodiments of the present disclosure may include an articulated mounting robot 1000 having multiple degrees of freedom, an assembly jig 2000 fastened to an end of the mounting robot 1000, a vehicle headliner 200 coupled to the assembly jig, a gripper 2200 provided in the assembly jig 2000 and gripping an assist handle 220 of the headliner 200, a pressurization unit 2300 provided in the assembly jig 2000 and pressurizing the headliner 200 to fasten a clip configured to couple the headliner 200 to a vehicle body, and a control unit (not shown) configured to control the mounting robot 1000 to move the assembly jig 2000 to which the headliner 200 has been mounted, controlling the gripper 2200 to attach or detach the assembly jig 2000 to or from the headliner 200, and controlling the pressurization unit 2300 to couple the headliner 200 to the vehicle body 100.

The control unit (not shown) according to an exemplary embodiment of the present disclosure may be implemented through a non-volatile memory (not shown) configured to store an algorithm configured to control operations of various elements of a vehicle or data related to software commands configured to run the algorithm, and a processor (not shown) configured to perform operations to be described below by using data stored in the corresponding memory. Here, the memory and the processor may be implemented as separate chips. Alternatively, the memory and the processor may be implemented as an integrated single chip and the processor may have a form of one or more processors.

The mounting robot 1000 may be fastened to the assembly jig 2000 at one end thereof, and include multiple degrees of freedom multi-joints so as to couple the assembly jig 2000 to the vehicle headliner 200 or smoothly move the headliner 200 coupled to the assembly jig 2000 to a mounting position of the headliner 200 of the vehicle body 100.

The assembly jig 2000 may be coupled to the vehicle headliner 200 and moved by the mounting robot 1000 so that the vehicle headliner 200 in a state in which the assembly jig 2000 is coupled to the vehicle headliner 200 may be moved accurately to the mounting position of the headliner 200 of the vehicle body 100.

Generally, the assist handle 220 may be provided in the headliner 200 of a vehicle and the assist handle 220 is gripped by the gripper 2200 provided in the assembly jig 2000 so that the headliner 200 of a vehicle and the assembly jig 2000 are coupled to each other.

When the headliner 200 coupled to the assembly jig 2000 is moved to the mounting position of the headliner 200 of the vehicle body 100 by the mounting robot 1000, the pressurization unit 2300 provided in the assembly jig 2000 may pressurize the clip configured to couple the headliner 200 and the vehicle body 100 to fasten the same. As such, the headliner 200 may be stably coupled to the vehicle body 100.

The control unit (not shown) may control the mounting robot 1000 to move the assembly jig 2000 so as to couple the headliner 200 to the assembly jig 2000 or move the headliner 200 coupled to the assembly jig 2000 to the mounting position of the headliner 200 of the vehicle body 100. In addition, the control unit (not shown) may control the gripper 2200 to attach or detach the assembly jig 2000 to or from the headliner 200 and control the pressurization unit 2300 to couple the headliner 200 to the vehicle body 100.

That is, by automatizing entire assembly process of a vehicle headliner 200 by the control unit (not shown), the non-uniformity of assembly quality that may be caused when an operator mounts and assembles the vehicle headliner 200 manually may be prevented. Furthermore, the effect of improving productivity by reducing the manpower input to the process may also be achieved.

For reference, FIG. 1 shows a state before operating the vehicle headliner assembly system according to embodiments of the present disclosure, illustrating that the assembly jig 2000 is stored in a separate assembly jig holder 2000' in a state of not coupled to the end of the mounting robot 1000 and the vehicle headliner 200.

That is, the assembly jig 2000 is stored in the separate assembly jig holder 2000' before operating the vehicle headliner assembly system according to embodiments of the present disclosure, fastened to an end of the mounting robot 1000 to couple the vehicle headliner 200 when operating the vehicle headliner assembly system, and finally released from the fastening with the mounting robot 1000 after the headliner 200 is coupled to the vehicle body 100 to be stored in the assembly jig holder 2000' again.

FIG. 1 shows a separate photographing robot 3100 including a vision camera 3200 configured to capture an image so as to perform position correction of the mounting robot 1000, and the description thereof will be additionally given below with the description of each element and the operation principle of the present disclosure.

Figure 2:
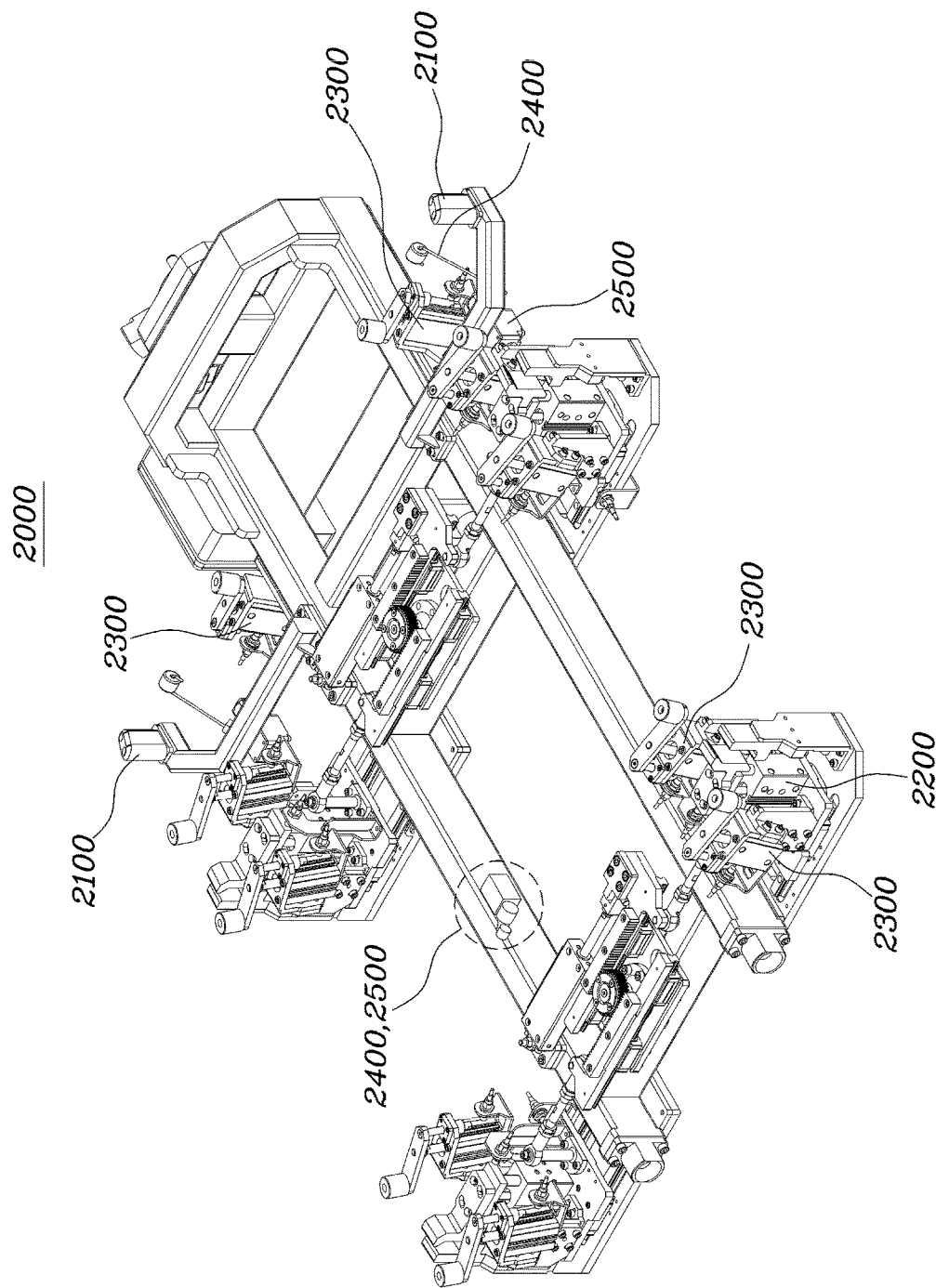
FIG. 2 is a drawing illustrating an assembly jig according to an exemplary embodiment of the present disclosure.

FIG. 2 is a drawing illustrating an assembly jig according to an exemplary embodiment of the present disclosure.

Referring to FIG. 2, the vehicle headliner assembly system according to embodiments of the present disclosure may further include a movement prevention unit 2100 provided in the assembly jig 2000, inserted into a sun visor hole 210 formed on the headliner 200 so that the headliner 200 is fixed to a normal position so as not to move on the assembly jig 2000.

Generally, the sun visor hole 210 may be provided in the vehicle headliner 200, and a connection unit of the sun visor may be inserted into and mounted to the sun visor hole 210. The sun visor may be provided at the front upper end in front of a driver seat and a passenger seat and function to block excessive sunlight from the front to a certain level while driving, which is an element usually provided in the vehicle.

That is, by inserting the movement prevention unit 2100 into the sun visor hole 210 essentially provided in the headliner to mount the sun visor, embodiments of the present disclosure may prevent the headliner 200 from moving on the assembly jig 2000 without a separate additional element to the headliner 200.

Figure 3:
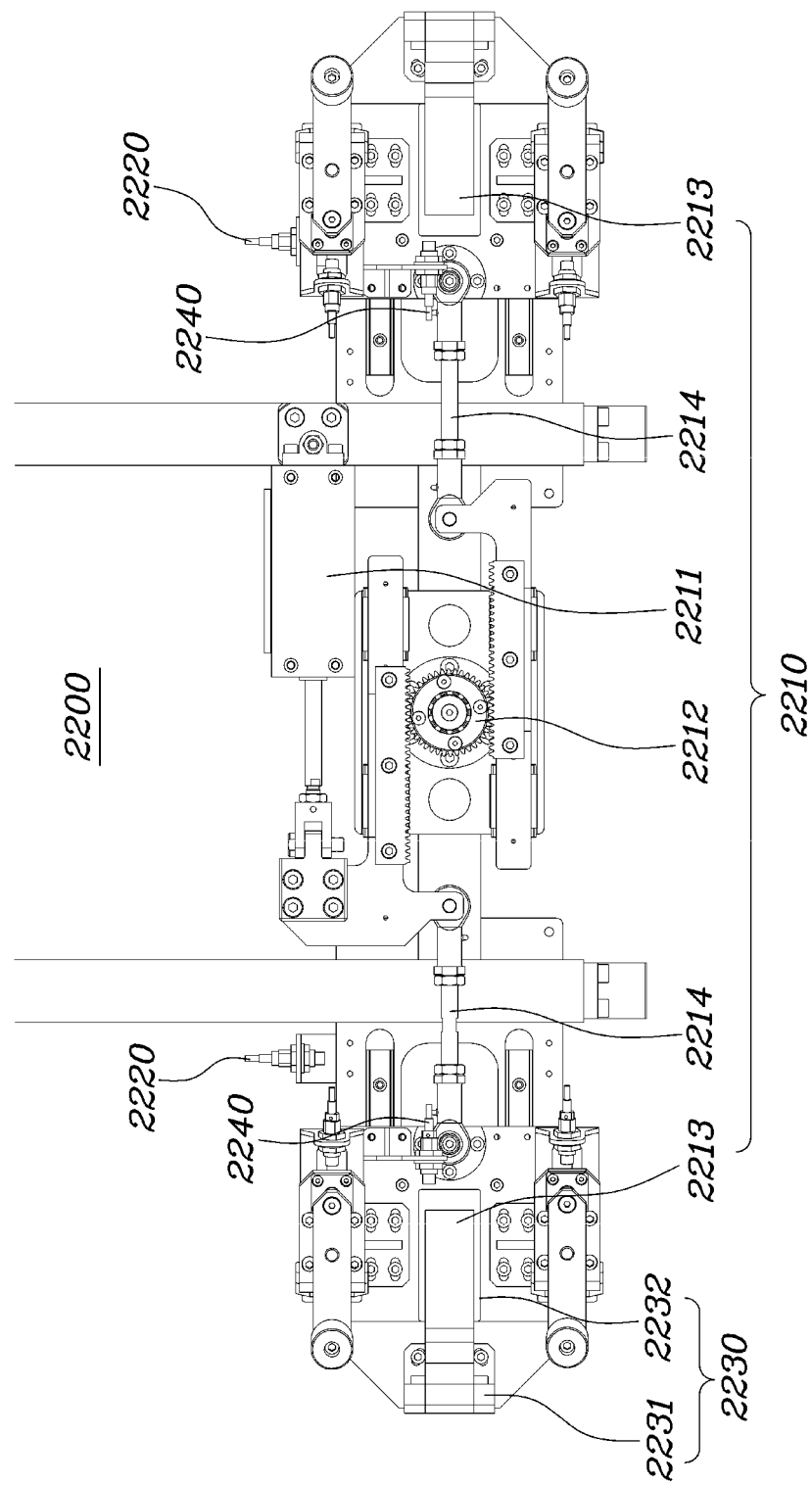
FIG. 3 is a drawing illustrating a gripper of an assembly jig according to an exemplary embodiment of the present disclosure.

FIG. 3 is a drawing illustrating a gripper of an assembly jig according to an exemplary embodiment of the present disclosure.

Referring to FIG. 3, the gripper 2200 of the vehicle headliner assembly system of embodiments of the present disclosure may include a handle opening unit 2210 configured to open the assist handle 220 having been folded onto the headliner 200, an opening identification sensor 2220 configured to identify whether the assist handle 220 is normally opened, a handle clamping unit 2230 configured to clamp the opened assist handle 220, and a clamping identification sensor 2240 configured to identify whether the assist handle 220 is normally clamped.

Generally, the assist handle 220 may be provided on the vehicle headliner 200 in a folded state. Accordingly, to grip the assist handle 220 with the gripper 2200, the folded assist handle 220 may need to be opened. To this end, the gripper 2200 of the vehicle headliner assembly system according to embodiments of the present disclosure may open the assist handle 220 folded onto the headliner 200 through the handle opening unit 2210 and identify whether the assist handle 220 is normally opened through the opening identification sensor 2220.

When the assist handle 220 is normally opened, the handle clamping unit 2230 may clamp the opened assist handle 220, and the clamping identification sensor 2240 may detect and identify whether the assist handle 220 is normally clamped.

As such, by providing each sensor to determine whether elements corresponding to each sensor normally operate, the reliability of the vehicle headliner assembly system according to embodiments of the present disclosure can be improved.

The handle opening unit 2210 may include an opening cylinder 2211 unidirectionally sliding in one direction between right and left directions of the vehicle body and a handle opening attach 2213 configured to open the assist handle 220 of the headliner 200 according to sliding of the opening cylinder 2211.

When the opening cylinder 2211 unidirectionally slides in one direction between right and left directions of the vehicle body, the handle opening attach 2213 may slide together according thereto, and the sliding of the handle opening attach 2213 may make the handle opening attach 2213 collide the assist handle 220 folded onto the headliner 200, and thus the assist handle 220 is opened.

Generally, the assist handle 220 may be provided on the vehicle headliner 200 through a coupling device capable of rotating at a certain angle, such as a hinge coupling. Therefore, when the handle opening attach 2213 slides against the assist handle 220, the assist handle 220 may be opened while rotating around the hinge connection part as a center axis.

Here, the hinge connection or the hinge connection part is merely a description for helping the understanding of the present disclosure and should not be construed as limiting the configuration of the present disclosure.

Multiple handle opening attaches 2213 may be provided and formed on the left and the right of the assembly jig 2000 to be symmetrical to each other. The handle opening unit 2210 may further include an equalizer 2212 configured to convert a linear movement according to the unidirectional sliding of the opening cylinder 2211 into a rotary movement and a rotary movement into a linear movement in a direction opposite to the sliding direction of the opening cylinder 2211, and a first shaft 2214 slid in left and right directions by the equalizer 2212 to slide together with the multiple handle opening attaches 2213 formed on the left and the right of the assembly jig 2000 to be symmetrical to each other.

The multiple assist handles 220 provided on the vehicle headliner 200 may be formed on the left and the right of the vehicle to be symmetrical to each other, and thus the handle opening attach 2213 configured to open the assist handles 220 may be also preferable to be formed on the left and the right of the assembly jig 2000 to be symmetrical to each other. In addition, when the handle opening attaches 2213 are formed to be bilaterally symmetrical, the assist handles 220 formed at left and right of the headliner 200 may be simultaneously opened when the assist handles 220 are opened, and therefore, the headliner 200 may be prevented from being pushed in the same direction as the sliding direction according to the sliding of the handle opening attach 2213.

Furthermore, as the handle opening unit 2210 includes the equalizer 2212 configured to convert a linear movement according to the unidirectional sliding of the opening cylinder 2211 into a rotary movement and a rotary movement into a linear movement in a direction opposite to the sliding direction of the opening cylinder, the assist handles 220 formed at the left and right of the headliner 200 may be simultaneously opened using one cylinder without a separate additional cylinder. Here, an example of the equalizer 2212 may include a device such as a rack and a pinion configured to convert a linear movement into a rotary movement. However, the example is merely described to help the understanding of the present disclosure and should not be construed as limiting the configuration of the present disclosure.

Furthermore, by including the first shaft 2214 slid in the left and right directions by the equalizer 2212 so as to slide the multiple handle opening attaches 2213 formed on the left and the right of the assembly jig 2000 to be symmetrical to each other, the multiple handle opening attaches 2213 may be slid by one cylinder.

For reference, FIG. 3 shows that the first shaft 2214 and the handle opening attach 2213 may be installed spaced a predetermined distance apart from each other. That is, the handle opening attach 2213 may be pushed to slide together by the sliding of the first shaft 2214. Here, the description merely separately shows elements for helping the understanding of the present disclosure and should not be construed as limiting the configuration of the present disclosure.

That is, unlike what is shown in FIG. 3, the first shaft 2214 and the handle opening attach 2213 may be integrally combined to be formed. In this case, it may be understood that the handle opening attach 2213 slides together as soon as the first shaft 2214 slides.

The opening identification sensor 2220 provided in the gripper 2200 of the vehicle headliner assembly system of embodiments of the present disclosure may be installed on a lateral surface of the first shaft 2214 at a predetermined distance apart and detects positions of a top dead point and a bottom dead point when the first shaft 2214 slides in left and right directions so as to determine whether the assist handle 220 of the headliner 200 is normally opened.

As shown in FIG. 3, the opening identification sensor 2220 may be installed on a lateral surface of the first shaft 2214 at a predetermined distance apart to detect the movement of the first shaft 2214. Specifically, when the first shaft 2214 slides in the left and right directions by the equalizer 2212, the opening identification sensor 2220 may detect the positions of the top dead point and the bottom dead point of the first shaft 2214 to determine that the assist handle 220 of the headliner 200 is normally opened when the first shaft 2214 is positioned at the bottom dead point and determine that the assist handle 220 of the headliner 200 is not normally opened when the first shaft 2214 is not positioned at the bottom dead point.

The top dead point is referred to as a point detected by the opening identification sensor 2220 before the first shaft 2214 is slid by the equalizer 2212 and the bottom dead point is referred to as a point detected by the opening identification sensor 2220 when the sliding of the first shaft 2214 by the equalizer 2212 is completed.

In describing various components, the terms, the top dead point and the bottom dead point may be used. However, the terms are used to only distinguish one element from the other element, and without departing from the scope of rights according to the concept of the present disclosure, the top dead point may be referred to as the bottom dead point, and the bottom dead point may also be referred to as the top dead point. Therefore, it should not be construed that the configuration of the present disclosure is limited by such terms.

The handle clamping unit 2230 provided at the gripper 2200 of the vehicle headliner assembly system according to embodiments of the present disclosure may include an angle limitation unit 2231 configured to limit the assist handle 220 of the headliner 200 not to be opened beyond a predetermined angle and a clamping cylinder 2232 configured to clamp or release clamping of the assist handle 220 of the headliner 200 by moving the handle opening attach 2213 provided in the handle opening unit 2210 upward or downward.

As described above, the handle opening attach 2213 may be slid together according to the unidirectional sliding of the opening cylinder 2211 and the assist handle 220 provided in the vehicle headliner 200 is opened according to the sliding of the handle opening attach 2213. Accordingly, when the handle opening attach 2213 unlimitedly slides, the assist handle 220 provided in the headliner 200 of a vehicle may be separated from the headliner 200 beyond being opened and damaged.

That is, the handle clamping unit 2230 provided at the gripper 2200 of the vehicle headliner assembly system according to embodiments of the present disclosure may set a limitation to a sliding distance of the handle opening attach 2213 and prevent the assist handle 220 from being separated from the headliner 200 and being damaged by including the angle limitation unit 2231 configured to limit the assist handle 220 of the headliner 200 not to be opened beyond a predetermined angle.

In addition, the angle imitation unit 2231 may contact the handle clamping unit 2230 in a form of surrounding the assist handle 220 together with the handle clamping unit 2230. That is, as a handle unit of the assist handle 220 is positioned between the angle limitation unit 2231 and the handle clamping unit 2230, the assist handle 220 may be clamped or released from being clamped according to the upward or downward movement of the handle clamping unit 2230 by the clamping cylinder 2232.

Here, the clamping identification sensor 2240 may be installed on one side of the handle opening attach 2213 at a predetermined distance apart and detects positions of a top dead point and a bottom dead point when the handle opening attach 2213 slides in upward and downward directions so as to determine whether the assist handle 220 of the headliner 200 is normally clamped.

As shown in FIG. 3, the clamping identification sensor 2240 may be installed on a lateral surface of the handle opening attach 2213 at a predetermined distance apart to detect the movement of the handle opening attach 2213. Specifically, when the handle opening attach 2213 is moved up or down by the clamping cylinder 2232, the clamping identification sensor 2240 may detect the positions of the top dead point and the bottom dead point of the handle opening attach 2213 to determine that the assist handle 220 of the headliner 200 is normally clamped when the handle opening attach 2213 is positioned at the top dead point and determine that the assist handle 220 of the headliner 200 is not normally clamped when the handle opening attach 2213 is not positioned at the top dead point.

The bottom dead point may be referred to as a point detected by the clamping identification sensor 2240 before the handle opening attach 2213 is moved by the clamping cylinder 2232, and the top dead point is referred to as a point detected by the clamping identification sensor 2240 when the moving of the handle opening attach 2213 by the clamping cylinder 2232 is completed.

In describing various components, the terms, the top dead point and the bottom dead point may be used. However, the terms are used to only distinguish one element from the other element, and without departing from the scope of rights according to the concept of the present disclosure, the top dead point may be referred to as the bottom dead point, and the bottom dead point may also be referred to as the top dead point. Therefore, it should not be construed that the configuration of the present disclosure is limited by such terms.

Figure 4:
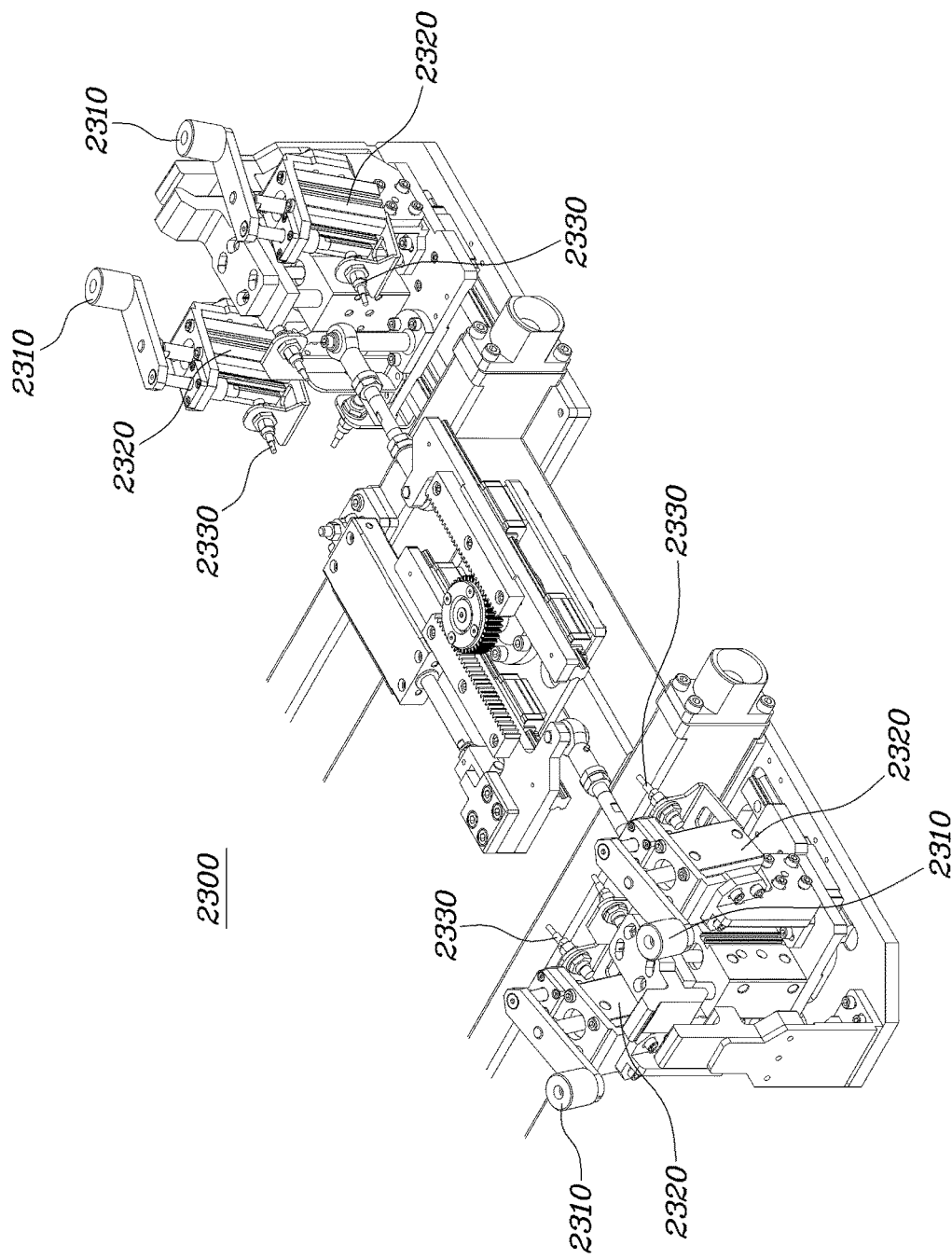
FIG. 4 is a drawing illustrating a pressurization unit of an assembly jig according to an exemplary embodiment of the present disclosure.

FIG. 4 is a drawing illustrating a pressurization unit of an assembly jig according to an exemplary embodiment of the present disclosure.

Referring to FIG. 4, the pressurization unit 2300 of the vehicle headliner assembly system of embodiments of the present disclosure may include a clip pressurization attach 2310 configured to pressurize a clip to mount the headliner 200 to the vehicle body 100, a pressurization cylinder 2320 configured to fasten a clip of the headliner 200 to the vehicle body 100 by moving the clip pressurization attach 2310 up or down, and a pressurization identification sensor 2330 configured to identify whether a clip is normally pressurized.

Generally, when mounting the headliner 200 to the vehicle body 100, a clip provided in the headliner 200 may be inserted into and thus fastened to a clip insertion hole provided in the vehicle body 100. That is, the clip pressurization attach 2310 of the vehicle headliner assembly system of embodiments of the present disclosure may be understood as a configuration for inserting and fastening a clip to a clip insertion hole.

In detail, the clip pressurization attach 2310 may be moved up or down by the pressurization cylinder 2320. When a piston of the pressurization cylinder 2320 moves forward, the clip pressurization attach 2310 is moved upward, and when the piston of the pressurization cylinder 2320 moves backward, the clip pressurization attach 2310 is moved downward.

As a result, by detecting the forward and backward movement of a piston of the pressurization cylinder 2320 by using the pressurization identification sensor 2330, it is possible to identify whether the clip pressurization attach 2310 moved up or down according to the forward or backward movement of the piston normally pressurizes the clip.

The pressurization identification sensor 2330 may be installed on one side of the clip pressurization attach 2310 at a predetermined distance apart and detect positions of a top dead point and a bottom dead point of a piston rod of the pressurization cylinder 2320 when the clip pressurization attach 2310 slides in upward and downward directions so as to determine whether the clip of the headliner 200 is normally pressurized.

As shown in FIG. 4, the pressurization identification sensor 2330 may be installed on a lateral surface of the clip pressurization attach 2310 at a predetermined distance apart to detect the movement of the clip pressurization attach 2310. Specifically, when the clip pressurization attach 2310 is moved up or down by the pressurization cylinder 2320, the pressurization identification sensor 2330 may detect the positions of the top dead point and the bottom dead point of the piston rod of the pressurization cylinder 2320 to determine that the clip of the headliner 200 is normally pressurized when the piston rod is positioned at the bottom dead point and determine that the clip of the headliner 200 is not normally pressurized when the piston rod is not positioned at the bottom dead point.

The top dead point may be referred to as a point detected by the pressurization identification sensor 2330 before the clip pressurization attach 2310 is moved by the pressurization cylinder 2320, and the bottom dead point is referred to as a point detected by the pressurization identification sensor 2330 when the moving of the clip pressurization attach 2310 by the pressurization cylinder 2320 is completed.

In describing various components, the terms, the top dead point and the bottom dead point may be used. However, the terms are used to only distinguish one element from the other element, and without departing from the scope of rights according to the concept of the present disclosure, the top dead point may be referred to as the bottom dead point, and the bottom dead point may also be referred to as the top dead point. Therefore, it should not be construed that the configuration of the present disclosure is limited by such terms.

Figure 5:
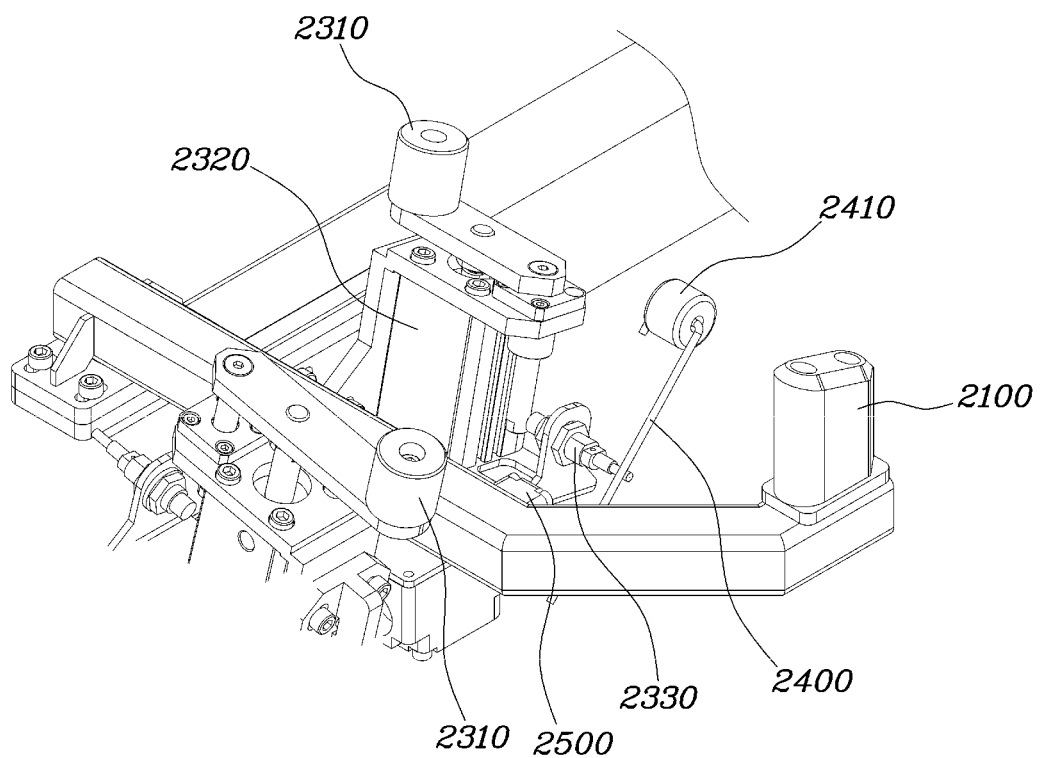
FIG. 5 is an enlarged drawing of a second shaft and a mounting identification sensor according to an exemplary embodiment of the present disclosure.

FIG. 5 is an enlarged drawing of a second shaft and a mounting identification sensor according to an exemplary embodiment of the present disclosure.

Referring to FIG. 5, the assembly jig 2000 of the vehicle headliner assembly system of embodiments of the present disclosure may further include a second shaft 2400 coupled and fixed to the assembly jig 2000 at one side thereof, formed to rotate within a predetermined angle with reference to the fixed side, and having a roller 2410 formed at the end of the other side thereof and bonded to a lower side of the headliner 200, and a mounting identification sensor 2500 installed on a lateral surface of the fixed side of the second shaft 2400 and detecting an angle change of the second shaft 2400.

As shown in FIG. 5, the second shaft 2400 may be coupled and fixed to the assembly jig 2000 at one side thereof and may rotate within a predetermined angle with reference to the fixed one side. Specifically, when an external force is applied to the roller 2410 formed at the end of the other side from the upper side to the lower side, the second shaft 2400 rotates downward around the fixed side.

Here, the second shaft 2400 may maintain a preconfigured angle before rotating by the external force, deviate from the preconfigured angle when rotating, and return to the preconfigured angle when the external force is removed.

When the assembly jig 2000 is coupled to the headliner 200 by gripping the assist handle 220 of the headliner 200 by the gripper 2200 of the assembly jig 2000, the roller 2410 formed at the end of the other side of the second shaft 2400 may be bonded to the headliner 200. In this case, an external force from the own load of the headliner 200 may be applied to the roller 2410, and thus the second shaft 2400 may rotate downward and deviates from the preconfigured angle.

When the pressurizing the clip of the headliner 200 by the clip pressurization attach 2310 is completed, the control unit (not shown) may cause the gripper of the assembly jig 2000 to release gripping of the assist handle 220 so as to separate the assembly jig 2000 from the headliner 200 and lower the separated assembly jig 2000.

Here, when the clip of the headliner 200 is normally fastened to the clip hole of the vehicle body 100, the headliner 200 may be coupled to be fixed to the vehicle body 100, and thus the roller 2410 formed at the end of the other side of the second shaft 2400 may be separated from the lower side of the headliner 200 according to the lowering of the assembly jig 2000. Accordingly, the second shaft 2400 may return to the preconfigured angle.

On the other hand, when the clip is not normally fastened, the headliner 200 may not be fixed to the vehicle body 100 and thus the headliner 200 may be lowered together with the assembly jig 2000 when the assembly jig 2000 is lowered. Therefore, the roller 2410 formed at the end of the other side of the second shaft 2400 may be maintained in a state of being bonded to the lower side of the headliner 200. Accordingly, the second shaft 2400 may maintain a state of deviating from the preconfigured angle.

The angle change of the second shaft 2400 described above may be detected by the mounting identification sensor 2500 installed on a lateral surface of the fixed side of the second shaft 2400. Specifically, the mounting identification sensor 2500 may determine that the headliner 200 is normally mounted to the vehicle body 100 when the second shaft 2400 is matched to the preconfigured angle and determine that the headliner 200 is not normally mounted to the vehicle body 100 when the second shaft is not matched to the preconfigured angle.

For reference, as shown in FIG. 2, the second shaft 2400 and the mounting identification sensor 2500 may be preferable to be diagonally installed, one each at the front and rear of the assembly jig 2000. By diagonally installed, it is possible to determine whether the headliner 200 is mounted in all areas of front, rear, left, and right, and the effect of reducing the manufacturing cost may be achieved by using the minimum number of components.

Here, one of each second shaft 2400 and mounting identification sensor 2500 may be formed at the front right side and the rear left side as shown in FIG. 2. Otherwise, one of each second shaft and mounting identification sensor may be formed at the front left side and the rear right side, as well.

Referring to FIG. 2 to FIG. 4, multiple pressurization units 2300 and grippers 2200 may be provided in the vehicle headliner assembly system of embodiments of the present disclosure, the pressurization units 2300 are formed to be bilaterally symmetrical at the front, middle, and rear sides of the assembly jig 2000 along the edge of the assembly jig 2000 and the grippers 2200 are positioned between the pressurization units 2300 excluding the pressurization units 2300 formed at the front side of the assembly jig 2000 so that two pressurization units 2300 may be arranged to form a pair by being spaced a predetermined distance apart from each other on both lateral surfaces of each of the grippers 2200.

Generally, the clip of the headliner 200 and the clip insertion hole of the vehicle body 100 may be formed to be bilaterally symmetrical at the front, middle, and rear sides of each of the headliner 200 and the vehicle body 100 for the stable coupling of headliner 200 and the vehicle body 100. Therefore, the pressurization unit 2300 configured to pressurize the clip may need to be formed at a position corresponding to each clip.

The gripper 2200 may grip the assist handle 220 of the headliner 200 and thus need to be formed to correspond to a position of the assist handle 220.

The gripper 2200 and the pressurization unit 2300 may perform different functions and therefore, it is common to separately perform the assembly processes of installation of each configuration to the assembly jig 2000. When the gripper 2200 is arranged to form one pair with the pressurization unit 2300 so as to be manufactured as one component module, the assembly jig 2000 may be installed by simply coupling one component module in which the gripper 2200 and the pressurization unit 2300 are arranged, and thus the assembly process may be simplified, and the productivity may be improved.

Therefore, the gripper 2200 and the pressurization unit 2300 of the vehicle headliner assembly system according to embodiments of the present disclosure may be arranged such that two pressurization units 2300 are arranged to form a pair by being spaced a predetermined distance apart from each other on both lateral surfaces of each of the grippers 2200.

Here, the positions of the middle and rear sides of the assembly jig 2000, in which the pressurization unit 2300 is disposed may correspond to the position of the assist handle 220 of the headliner 200. That is, the assist handle 220 may not correspond to the front side of the assembly jig 2000, and thus the gripper 2200 does not need to be positioned thereon.

As a result, only the pressurization unit 2300 may be disposed on the front side of the assembly jig 2000, and the gripper 2200 may be positioned between the pressurization units 2300 excluding the pressurization unit 2300 formed on the front side of the assembly jig 2000 so that two pressurization units 2300 and one gripper 220 may form a pair.

Figure 6:
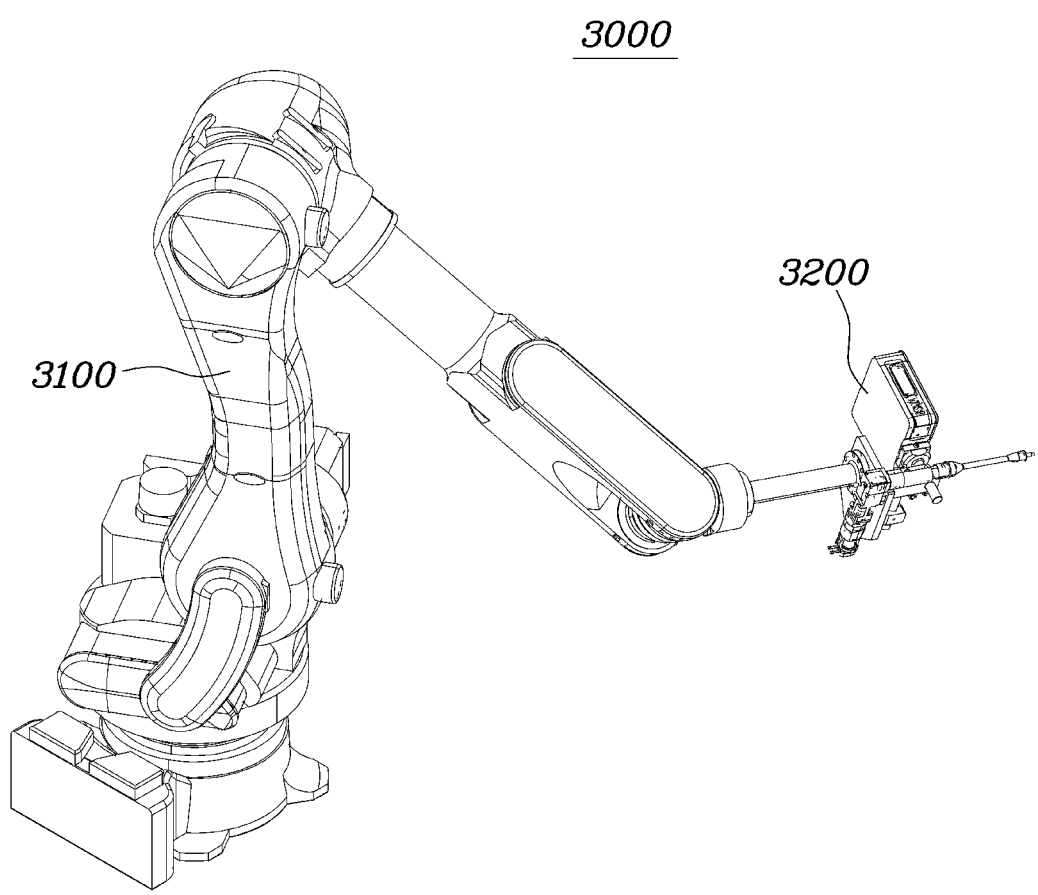
FIG. 6 is a drawing illustrating a photographing unit according to an exemplary embodiment of the present disclosure.

FIG. 6 is a drawing illustrating a photographing unit according to an exemplary embodiment of the present disclosure.

Referring to FIG. 6, the vehicle headliner assembly system of embodiments of the present disclosure may further include a photographing unit 3000 configured to capture each position of a fastening part of the vehicle body 100 to which the clip of the headliner 200 is fastened and the assist handle 220 of the headliner 200, which is gripped by the gripper 2200, and the control unit (not shown) may calculate a correction value on the basis of captured information and move the mounting robot 1000 on the basis of the correction value.

The photographic unit 3000 may include a photographing robot 3100 provided separately from the assembly jig 2000, and a vision camera 3200 provided in the photographing robot 3100. The vision camera 3200 may be provided in the assembly jig 2000. The case in which the vision camera 3200 is provided in the assembly jig 2000 may have a drawback that when applying the vehicle headliner assembly system of embodiments of the present disclosure to various types of vehicles, the assembly jig 2000 needs to be reconfigured.

On the other hand, the case in which the vision camera 3200 is provided in the photographing robot 3100 may have an advantage of applying the vehicle headliner assembly system of embodiments of the present disclosure without separate reconfiguring by controlling the photographing robot 3100 according to types of vehicles to change a photographing site.

Generally, when controlling movement of a robot, a stop error inevitably occurs due to inertial force or the like during a stopping process of a robot. Therefore, a method for correcting such an error is required.

To this end, the photographing unit 3000 of the vehicle headliner assembly system of embodiments of the present disclosure may photograph each position of the assist handle 220 of the headliner 200 gripped by the gripper 2200 and the fastening part of the vehicle body 100 to which the clip of the headliner 200 is fastened. Here, the fastening part of the vehicle body 100 captured by the photographing unit 3000 may denote the clip insertion hole.

The control unit (not shown) may calculate a correction value on the basis of the captured information and move the mounting robot 1000 on the basis of the correction value. In detail, the control unit (not shown) may recognize coordinate values of the information captured by the vision camera 3200, compare the coordinate values with preconfigured target coordinate values, and calculate a correction value according to an error obtained therefrom. The calculated correction value may be transferred to a control unit of the mounting robot 1000, the mounting robot 1000 may move according to the received correction value, and thus the error may be corrected.

The position correction process may be performed when the assembly jig 2000 is fastened to an end of the mounting robot 1000 and moved to grip the assist handle 220 of the headliner 200, or when the assembly jig 2000 to which the headliner 200 is mounted is moved to couple the headliner 200 to the vehicle body 100, and accordingly, the mounting robot 1000 and the assembly jig 2000 may be positioned at correct positions.

Figure 7:
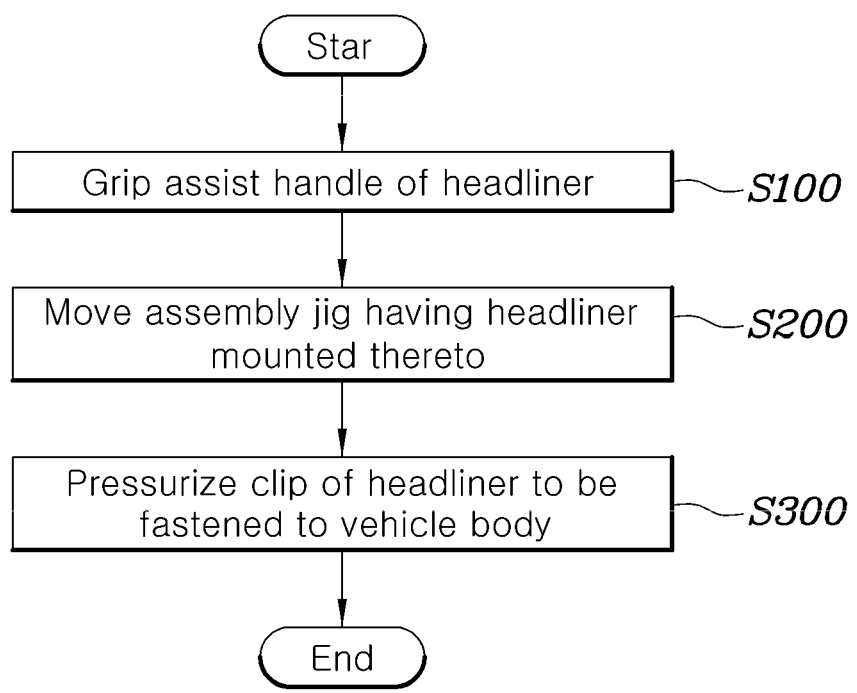
FIG. 7 is a flowchart illustrating a vehicle headliner assembly method using a vehicle headliner assembly system according to an exemplary embodiment of the present disclosure.

FIG. 7 is a flowchart illustrating a vehicle headliner assembly method using a vehicle headliner assembly system according to an exemplary embodiment of the present disclosure.

Referring to FIG. 7, a vehicle headliner assembly method according to embodiments of the present disclosure may include controlling, by a control unit, a gripper provided on an assembly jig to grip an assist handle of a headliner (S100), controlling, by the control unit, an articulate robot having multiple degrees of freedom to move the assembly jig having the headliner mounted thereto (S200), and controlling, by the control unit, a pressurization unit provided on the assembly jig to fasten a clip configured to couple the headliner to a vehicle body (S300).

In other words, the control unit (not shown) of the vehicle headliner according to embodiments of the present disclosure may control the photographing unit 3000 to correct a position, control the gripper attach or detach the assembly jig to or from the headliner (S100), control the mounting robot to move the headliner coupled to the assembly jig to a headliner mounting position of the vehicle body (S200), and control the pressurization unit to couple the headliner to the vehicle body (S300). A position correction may be carried out according to photographing information of the photographing unit 3000 before each operation.

As a result, the whole process of vehicle headliner 200 assembly may be automatized through one control unit (not shown) and therefore, the non-uniformity of assembly quality may be prevented and the manpower input to the process may be reduced.

Figure 8:
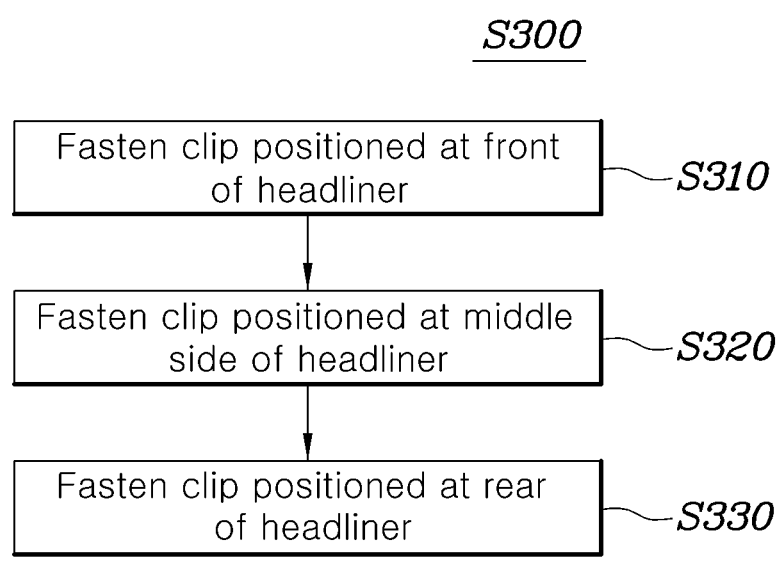
FIG. 8 is a flowchart illustrating an operation of fastening a clip in a vehicle headliner assembly method using a vehicle headliner assembly system according to an exemplary embodiment of the present disclosure.

FIG. 8 is a flowchart illustrating an operation of fastening a clip in a vehicle headliner assembly method using a vehicle headliner assembly system according to an exemplary embodiment of the present disclosure.

Referring to FIG. 8, the operation of fastening a clip in the vehicle headliner assembly method may include fastening a clip positioned at the front of a headliner (S310), fastening a clip positioned at the middle side of the headliner (S320), and fastening a clip positioned at the rear of the headliner (S330).

When the headliner 200 is forcefully mounted to the vehicle body 100, the clip or the clip insertion hole may be twisted, or a phenomenon in which the clip is biased toward one of the left and right directions may occur. The problems described above may be resolved by adjusting sizes of the clip and clip insertion hole to secure an extra space when the clip is fastened, and an assembly order favorable for sustaining an assembly margin that may occur during an assembly operation is derived according to conditions for securing an extra space.

Therefore, by fastening the clip in the order described above, the operation of fastening the clip in the vehicle headliner assembly method according to embodiments of the present disclosure may sustain an assembly margin and enable the assembly process to be stably performed.

While certain embodiments have been illustrated and described above, it would be obvious to a person skilled in the art that various changes and modifications can be made without departing from the spirit of the claims.

What is claimed is:

1. A vehicle headliner assembly system comprising:
   an articulated mounting robot having multiple degrees of freedom;
   an assembly jig fastened to the mounting robot;
   a vehicle headliner coupled to the assembly jig;
   a gripper provided in the assembly jig and configured to engage the headliner;
   a pressurization unit provided and configured to pressurize the headliner to couple the headliner to a vehicle body; and
   a control unit configured to:
      control the mounting robot to move the assembly jig,
      control the gripper to attach or detach the assembly jig to or from the headliner, and
      control the pressurization unit to couple the headliner to the vehicle body.

2. The vehicle headliner assembly system of claim 1, further comprising a movement prevention unit provided in the assembly jig and inserted into a sun visor hole formed on the headliner so that the headliner is fixed to a normal position so as not to move on the assembly jig.

3. The vehicle headliner assembly system of claim 1, wherein the gripper comprises:
   a handle opening unit configured to open an assist handle of the headliner that is folded onto the headliner;
   an opening identification sensor configured to identify whether the assist handle is opened;
   a handle clamping unit including a clamping cylinder, and configured to clamp the assist handle; and
   a clamping identification sensor configured to identify whether the assist handle is clamped.

4. The vehicle headliner assembly system of claim 3, wherein the handle opening unit comprises:
   an opening cylinder configured to slide in one direction among right and left directions of the vehicle body; and
   a handle opening attach configured to open the assist handle of the headliner according to sliding of the opening cylinder.

5. The vehicle headliner assembly system of claim 4,
   wherein multiple handle opening attaches are provided and formed on a left and a right of the assembly jig to be symmetrical to each other, and
   wherein the handle opening unit further comprises:
      an equalizer configured to convert a linear movement according to unidirectional sliding of the opening cylinder into a rotary movement and a rotary movement into a linear movement in a direction opposite to the sliding direction of the opening cylinder; and
      a first shaft slid in left and right directions by the equalizer to slide together with the multiple handle opening attaches formed on the left and the right of the assembly jig to be symmetrical to each other.

6. The vehicle headliner assembly system of claim 5, wherein the opening identification sensor:
   is installed on a lateral surface of the first shaft at a predetermined distance apart from the first shaft, and
   detects positions of a top dead point and a bottom dead point when the first shaft slides in left and right directions so as to determine whether the assist handle of the headliner is opened.

7. The vehicle headliner assembly system of claim 4, wherein the handle clamping unit
   is configured to limit the assist handle of the headliner not to be opened beyond a predetermined angle; and comprises
   the clamping cylinder configured to clamp or release clamping of the assist handle of the headliner by moving the handle opening attach provided in the handle opening unit upward or downward.

8. The vehicle headliner assembly system of claim 4, wherein the clamping identification sensor:
- is installed on one side of the handle opening attach at a predetermined distance apart from the handle opening attach, and
- detects a top dead point and a bottom dead point when the handle opening attach slides in upward and downward directions so as to determine whether the assist handle of the headliner is clamped.

9. The vehicle headliner assembly system of claim 1, wherein the pressurization unit comprises:
- a clip pressurization attach configured to pressurize a clip to mount the headliner to the vehicle body;
- a pressurization cylinder configured to fasten the clip of the headliner to the vehicle body by moving the clip pressurization attach up or down; and
- a pressurization identification sensor configured to identify whether a clip is pressurized.

10. The vehicle headliner assembly system of claim 9, wherein the pressurization identification sensor:
- is installed on one side of the clip pressurization attach at a predetermined distance apart from the clip pressurization attach, and
- detects positions of a top dead point and a bottom dead point of a piston rod of the pressurization cylinder when the clip pressurization attach slides in upward and downward directions so as to determine whether the clip of the headliner is pressurized.

11. The vehicle headliner assembly system of claim 1, wherein the assembly jig further comprises:
- a second shaft coupled and fixed to the assembly jig at one side of the second shaft, formed to rotate within a predetermined angle with reference to the one side, and having a roller formed at another side of the second shaft and bonded to a lower side of the headliner; and
- a mounting identification sensor installed on a lateral surface of the one side of the second shaft and configured to detect an angle change of the second shaft.

12. The vehicle headliner assembly system of claim 1, wherein multiple pressurization units and grippers are provided,
wherein the multiple pressurization units are formed to be bilaterally symmetrical at front, middle, and rear sides of the assembly jig along an edge of the assembly jig, respectively and
wherein the grippers are positioned between pressurization units excluding the pressurization units formed at the front side of the assembly jig so that two pressurization units are arranged to form a pair by being spaced a predetermined distance apart from each other on opposite sides of each of the grippers.

13. The vehicle headliner assembly system of claim 1, further comprising:
- a photographing unit configured to capture each position of a fastening part of the vehicle body to which a clip of the headliner is fastened, and
- an assist handle of the headliner gripped by the gripper,
wherein the control unit calculates a correction value on the basis of captured information and moves the mounting robot on the basis of the correction value.

14. A vehicle headliner assembly method using the vehicle headliner assembly system of claim 1, the method comprising:
- controlling, by the control unit, the gripper provided on the assembly jig to grip an assist handle of the headliner;
- controlling, by the control unit, the articulated mounting robot having multiple degrees of freedom to move the assembly jig having the headliner mounted thereto; and
- fastening a clip configured to couple the headliner to a vehicle body by controlling the pressurization unit provided on the assembly jig by the control unit.

15. The method of claim 14, wherein the fastening a clip comprises:
- fastening a clip positioned at a front of the assembly jig;
- fastening a clip positioned at a middle side of the assembly jig; and
- fastening a clip positioned at a rear of the assembly jig.

* * * * *